(12) United States Patent
Kim

(10) Patent No.: US 7,342,618 B2
(45) Date of Patent: Mar. 11, 2008

(54) BACKLIGHT DEVICE COMPRISING A PRINTING PORTION MADE OF COLORLESS INK FOR PREVENTING A BRIGHT LINE AND LIQUID CRYSTAL DISPLAY DEVICE HAVING THE SAME

(75) Inventor: Sung-Kon Kim, Kyoungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 89 days.

(21) Appl. No.: 09/741,045

(22) Filed: Dec. 21, 2000

(65) Prior Publication Data

US 2001/0013911 A1    Aug. 16, 2001

(30) Foreign Application Priority Data

Dec. 29, 1999    (KR)    ................ 1999-65036

(51) Int. Cl.
  *G02F 1/1335*    (2006.01)
(52) U.S. Cl. .................... 349/65; 362/26; 362/608; 349/64; 349/67
(58) Field of Classification Search .............. 349/65, 349/113, 64, 67, 62, 63, 112, 57; 362/26, 362/27, 606, 608, 615, 623, 609
  See application file for complete search history.

(56) References Cited

U.S. PATENT DOCUMENTS 5,649,754 A * 7/1997 Matsumoto ................. 362/618
5,886,759 A * 3/1999 Mashino et al. .............. 349/65
6,099,134 A * 8/2000 Taniguchi et al. ............ 362/31
6,219,117 B1 * 4/2001 Nagakubo et al. ............ 349/65
6,425,673 B1 * 7/2002 Suga et al. ................... 362/31

FOREIGN PATENT DOCUMENTS

| JP | 08-122537 | 5/1996 |
| JP | 08-240720 | 9/1996 |
| KR | 1998-24960 | 7/1998 |

* cited by examiner

*Primary Examiner*—Thoi V. Duong
(74) *Attorney, Agent, or Firm*—Birch, Stewart, Kolasch & Birch, LLP

(57) ABSTRACT

A back light device for use in a liquid crystal display device, which includes: at least one lamp; a light guide plate for guiding light emitting from the lamp; a diffusing sheet for diffusing light emitting from the light guide plate; at least one prism sheet located on the diffusing sheet, concentrating light; a protecting sheet located on the prism sheet; and a reflector located under the light guide plate, reflecting light directing downward the light guide plate. At least one of an edge portion of the diffusing sheet adjacent to the lamp, an edge portion of the protecting sheet adjacent to the lamp, and the reflector includes a printing portion made of colorless ink containing a light scattering agent.

17 Claims, 3 Drawing Sheets

BACKLIGHT DEVICE COMPRISING A PRINTING PORTION MADE OF COLORLESS INK FOR PREVENTING A BRIGHT LINE AND LIQUID CRYSTAL DISPLAY DEVICE HAVING THE SAME

CROSS REFERENCE

This application claims the benefit of Korean Patent Application No. 99-65036, filed on Dec. 29, 1999, under 35 U.S.C. § 119, the entirety of which is hereby incorporated by reference.

BACKGROUND OF THE INVENTION

1. Field of the Invention

The present invention relates to a liquid crystal display (LCD) device, and more particularly, to a back light device for use in a LCD device.

2. Description of Related Art

Liquid crystal display (LCD) devices are in wide use as display devices capable of having reduced weight, size and thickness. Of these, active matrix LCD devices, in which thin film transistors (TFTs) and pixel electrodes are arranged in the form of a matrix, have been widely used due to high resolution and excellent performance in implementing moving images.

FIG. 1 is a cross-sectional view illustrating a liquid crystal panel of a typical active matrix LCD device. As shown in FIG. 1, the liquid crystal panel 20 includes lower and upper substrates 2 and 4 with a liquid crystal layer 10 interposed therebetween. The lower substrate 2 is divided into two regions: a region S; and a region P. TFTs are arranged on the region S as a switching element, and pixel electrodes 14 are arranged on the pixel region P. The upper substrate 4 includes a color filter 8 and a common electrode 12. Through the pixel electrode 14 and the common electrode 12, voltages are applied to the liquid crystal layer 10. In order to prevent a leakage of the liquid crystal, edge portions of the two substrate 2 and 4 are sealed by a sealant 6. The TFT receives signals from an external drive integrated circuit (IC) to drive the pixel electrode 14.

Such LCD devices are divided into transmissive LCD devices and reflective LCD devices. The transmissive LCD device includes a back light device for providing the liquid crystal panel 20 with light.

FIG. 2 is a schematic view illustrating a conventional transmissive LCD device having a back light device. As shown in FIG. 2, light generated from the back light device 30 directs toward the liquid crystal panel 20.

However, part of light generated from the back light device 30 is reflected from an edge portion "A" of a bottom surface of the liquid crystal panel 20, and reflected light causes a constructive interference along with light generated from the back light device. As a result, a portion "B" of the back light device 30 is relatively stronger in brightness than other portions around the portion "B", whereby a bright line occurs along a dot line on an active area, i.e., a screen. In general, a bright line may occur even when a gap between a lamp housing and a light guide plate does not exist. This is the result of light that directs inward from the light guide plate does not conduct a total reflection and does not form a uniform light distribution before emitting from the light guide plate.

In order to prevent a bright line, several conventional solutions have been introduced. FIG. 3 shows one of conventional solutions to prevent a bright line. As shown in FIG. 3, a black pad 40 is formed along an edge portion of the top surface of the back light device 30. However, such a solution is very difficult to work. In addition, when an assembly error occurs between the liquid crystal panel 20 and either of the back light device 30 and the black pad 40, inferiorities result such as a bright line, a light leakage, and a covering of an edge portion of an active area. For example, when the black pad 40a is located outside a proper location, a bright line occurs along a dot line. Further, when the black pad 40b is located inside a proper location, the black pad 40b covers an active area.

FIG. 4 shows another solution to prevent a bright line according to the conventional art. As shown in FIG. 4, the back light device includes a lamp 31 as a light source. A lamp housing 39 surrounds most of the lamp 31. A lamp reflector 32 is located inside of the lamp housing 39. A light guide plate 33 is located adjacent to the lamp 31. Light emitted from the lamp 31 directs toward the liquid crystal panel (not shown) through the light guide plate 33. The light guide plate 33 has a plurality of patterns 33a (for example, a dot pattern) on its bottom surface. The patterns 33a are formed by a printing, a V-cut, molding or the like. A plurality of sheets are stacked on the light guide plate 33: a diffusing sheet 35; two prism sheets 36 and 37; and a protecting sheet 38. A reflector 34 is located under the light guide plate 33. On the reflector 34, a printing portion 34a is formed to prevent a bright line that comes from light incident to an upper or a lower surface of the light guide plate 33 other than an emitting portion of the light guide plate 34. The printing portion 34a is colored by mixing colors and a certain pattern of a gray scale.

However, the printing portion 34a of the reflector 34 may lower the brightness. Further, a brightness deviation may occur due to a variation of a printing portion size and an ink color, an assembly error, and a fluctuation of the reflector.

For the foregoing reasons, there is a need for a back light device that prevents a bright line and a liquid crystal display device having the same.

SUMMARY OF THE INVENTION

To overcome the problems described above, a preferred embodiment of the present invention provide back light device that prevents a bright line and a liquid crystal display device having the same.

In order to achieve the above object, the preferred embodiments of the present invention provide a back light device for used in a liquid display device, including: at least one lamp; a light guide plate for guiding light emitting from the lamp; a diffusing sheet for diffusing light emitting from the light guide plate; at least one prism sheet located on the diffusing sheet, concentrating light; a protecting sheet located on the prism sheet; a reflector located under the light guide plate, reflecting light directing downward from the light guide plate, wherein at least one of an edge portion of the diffusing sheet adjacent to the lamp, an edge portion of the protecting sheet adjacent to the lamp, and the reflector includes a printing portion made of colorless ink containing a light scattering agent.

The preferred embodiments of the present invention further provide a liquid crystal display device, including: a liquid crystal panel including two substrates with a liquid crystal layer interposed therebetween; a back light device including: a) at least one lamp; b) a light guide plate for guiding light emitting from the lamp; c) a diffusing sheet for diffusing light emitting from the light guide plate; d) at least one prism sheet located on the diffusing sheet, concentrating light; e) a protecting sheet located on the prism sheet; f) a reflector located under the light guide plate, reflecting light directing downward the light guide plate, wherein at least one of an edge portion of the diffusing sheet adjacent to the lamp, an edge portion of the protecting sheet adjacent to the lamp, and the reflector includes a printing portion made of colorless ink containing a light scattering agent.

There are two lamps.

Using the back light device for use in the transmissive LCD device according to the present invention, a bright line is prevented, thereby improving a brightness.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFERRED EMBODIMENTS

Reference will now be made in detail to preferred embodiments of the present invention, example of which is illustrated in the accompanying drawings.

Figure 1:
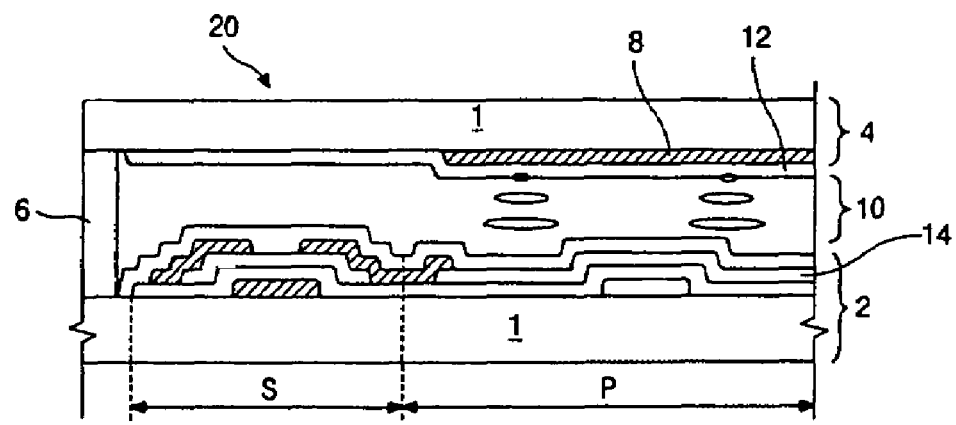
FIG. 1 is a cross-sectional view illustrating a liquid crystal panel of an active matrix liquid crystal display (LCD) device according to a conventional art.
Figure 2:
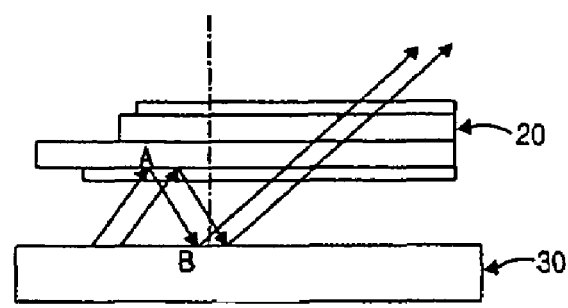
FIG. 2 is a schematic view illustrating a transmissive LCD device according to the conventional art.
Figure 3:
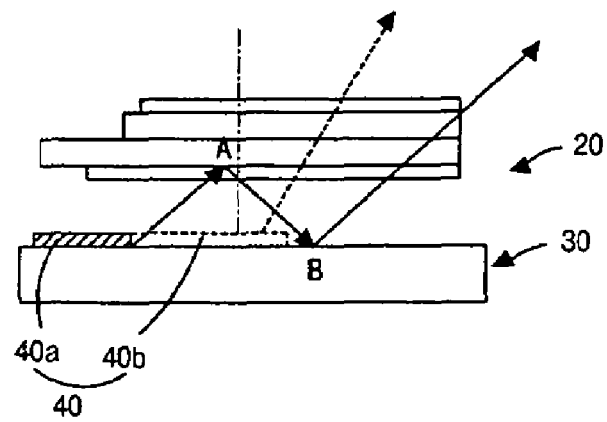
FIG. 3 shows one solution to prevent a bright light according to the conventional art.
Figure 4:
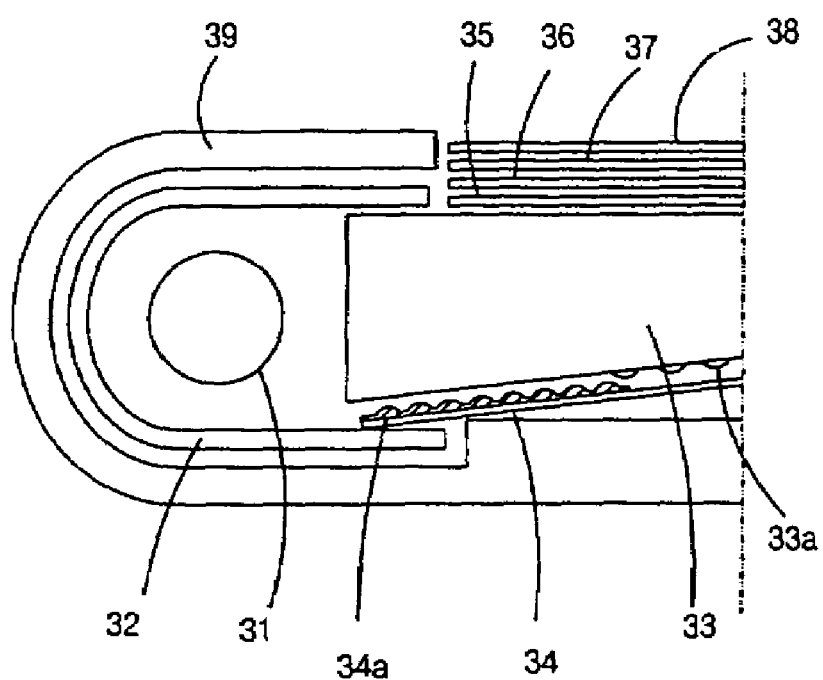
FIG. 4 shows another solution to prevent a bright light according to the conventional art.
Figure 5:
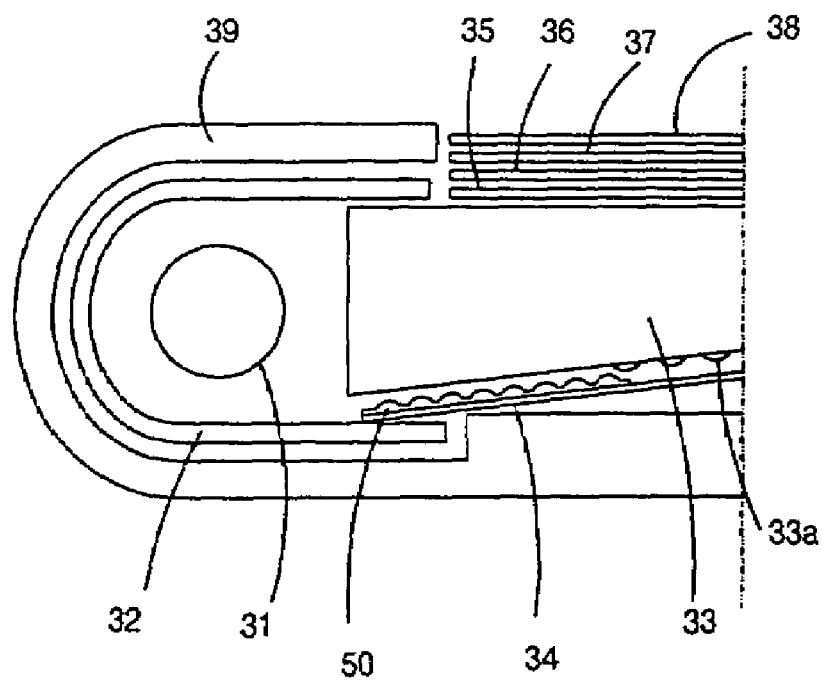
FIG. 5 is a schematic view illustrating a back light device for use in a transmissive liquid crystal display (LCD) device according to a first preferred embodiment of the present invention.

FIG. 5 is a schematic view illustrating a back light device for use in a transmissive liquid crystal display (LCD) device according to a first preferred embodiment of the present invention. As shown in FIG. 5, the back light device includes a lamp 31 as a light source. At this point, in the case of large-sized LCD devices, at least two lamps may be arranged. A lamp housing 39 surrounds most part of the lamp 31. A lamp reflector 32 is located inside of the lamp housing 39. A light guide plate 33 is located adjacent to the lamp 31. Light emitted from the lamp 31 directs toward the liquid crystal panel (not shown) through the light guide plate 33. The light guide plate 33 has a plurality of patterns 33a (for example, a dot pattern) on its bottom surface. The patterns 33a are formed by a printing, a V-cut, molding or the like. A plurality of sheets are stacked on the light guide plate 33: a diffusing sheet 35; two prism sheets 36 and 37; and a protecting sheet 38. A reflector 34 is located under the light guide plate 33. A printing portion 50 is formed on a surface of the reflector 34.

The printing portion 50 is made of colorless ink containing a light scattering agent. As a result, light reflected from the reflector 34 is scattered, thereby preventing light from being concentrated at a certain portion. Therefore, a bright line is prevented, leading to a high brightness.

Figure 6:
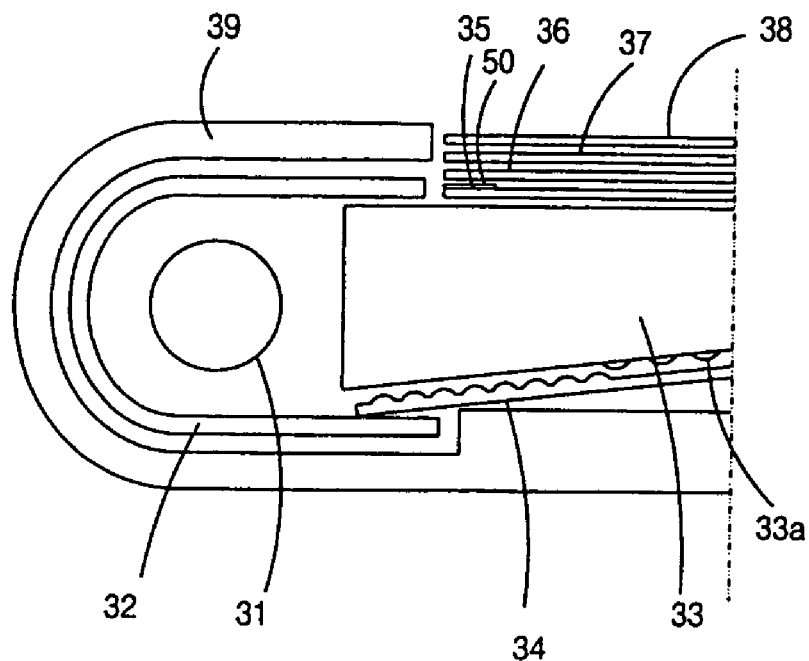
FIG. 6 is a schematic view illustrating a back light device for use in a transmissive liquid crystal display (LCD) device according to a second preferred embodiment of the present invention.

FIG. 6 is a schematic view illustrating a back light device for use in a transmissive LCD device according to a second preferred embodiment of the present invention. As shown in FIG. 6, the back light device includes a lamp 31 as a light source. At this point, in the case of large-sized LCD devices, at least two lamps may be arranged. A lamp housing 39 surrounds most part of the lamp 31. A lamp reflector 32 is located inside of the lamp housing 39. A light guide plate 33 is located adjacent to the lamp 31. Light emitted from the lamp 31 directs toward the liquid crystal panel (not shown) through the light guide plate 33. The light guide plate 33 has a plurality of patterns 33a (for example, a dot pattern) on its bottom surface. The patterns 33a are formed by a printing, a V-cut, molding or the like. A plurality of sheets are stacked on the light guide plate 33: a diffusing sheet 35; two prism sheets 36 and 37; and a protecting sheet 38. A reflector 34 is located under the light guide plate 33.

At this time, the diffusing sheet 35 includes a printing portion 50 at its edge portion adjacent to the lamp 31. The printing portion 50 is made of colorless ink containing a light scattering agent. As a result, even thought light reflected from a bottom surface of the liquid crystal panel (not shown) causes a constructive interference together with light emitting from the lamp 31, light is scattered due to the printing portion 50 so that light is not concentrated at a certain portion, thereby preventing a bright line. Further, brightness is improved.

Figure 7:
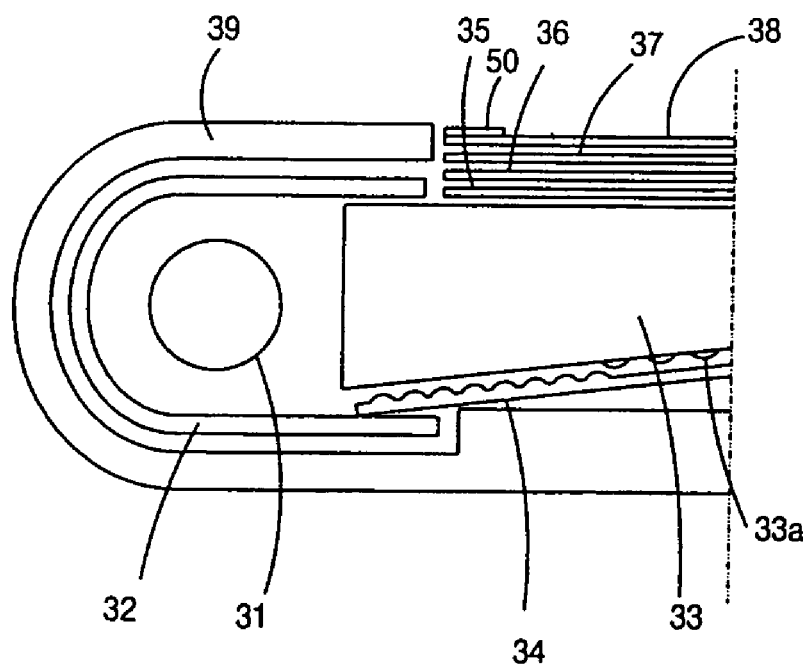
FIG. 7 is a schematic view illustrating a back light device for use in a transmissive liquid crystal display (LCD) device according to a third preferred embodiment of the present invention.

FIG. 7 is a schematic view illustrating a back light device for use in a transmissive LCD device according to a third preferred embodiment of the present invention. As shown in FIG. 7, the back light device includes a lamp 31 as a light source. At this point, in case of large-sized LCD devices, at lease two lamps may be arranged. A lamp housing 39 surrounds most part of the lamp 31. A lamp reflector 32 is located inside of the lamp housing 39. A light guide plate 33 is located adjacent to the lamp 31. Light emitted from the lamp 31 directs toward the liquid crystal panel (not shown) through the light guide plate 33. The light guide plate 33 has a plurality of patterns 33a (for example, a dot pattern) on its bottom surface. The patterns 33a are formed by a printing, a V-cut, molding or the like. A plurality of sheets are stacked on the light guide plate 33: a diffusing sheet 35; two prism sheets 36 and 37; and a protecting sheet 38. A reflector 34 is located under the light guide plate 33.

At this time, the protecting sheet 38 includes a printing portion 50 at its edge portion adjacent to the lamp 31. The printing portion 50 is made of colorless ink containing a light scattering agent. As a result, even thought light reflected from a bottom surface of the liquid crystal panel (not shown) causes a constructive interference together with light emitting from the lamp 31, light is scattered due to the printing portion 50 so that light is not concentrated at a certain portion, thereby preventing a bright line. Further a brightness is improved.

In the preferred embodiments of the present invention, the printing portion 50 is located on either of top and bottom surfaces of each sheet.

As described herein before, using the back light device for use in the transmissive LCD device according to the present invention, a bright line is prevented, thereby improving a brightness.

While the invention has been particularly shown and described with reference to first preferred embodiment s thereof, it will be understood by those skilled in the art that the foregoing and other changes in form and details may be made therein without departing from the spirit and scope of the invention.

What is claimed is:

1. A back light device for use in a liquid crystal display device, comprising:
   at least one lamp;
   a light guide plate for guiding light emitting from the lamp;
   a diffusing sheet for diffusing light emitting from the light guide plate;
   at least one prism sheet located on the diffusing sheet, concentrating light;
   a protecting sheet located on the prism sheet; and
   a reflector located under the light guide plate, reflecting light directing downward the light guide plate,
   wherein at least one of an entire edge portion of the diffusing sheet adjacent to the lamp, an entire edge portion of the protecting sheet adjacent to the lamp, or an entire edge portion of the reflector includes a printing portion made of colorless ink containing a light scattering agent such that light reflected from a bottom surface of the display device that causes constructive interference with light emitting from the lamp is scattered thereby preventing a bright line on the display device and the printing portion is formed as a single body.

2. The back light device of claim 1, wherein the at least one lamp includes two lamps.

3. The backlight device of claim 1, wherein the light guide plate has a plurality of patterns.

4. The back light device of claim 3, wherein the patterns are dots.

5. A liquid crystal display device, comprising:
   a liquid crystal panel including two substrates with a liquid crystal layer interposed therebetween; and
   a back light device including:
   a) at least one lamp;
   b) a light guide plate for guiding light emitting from the lamp;
   c) a diffusing sheet for diffusing light emitting from the light guide plate;
   d) at least one prism sheet located on the diffusing sheet, concentrating light;
   e) a protecting sheet located on the prism sheet; and
   f) a reflector located under the light guide plate, reflecting light directing downward the light guide plate,
   wherein at least one of an entire edge portion of the diffusing sheet adjacent to the lamp, an entire edge portion of the protecting sheet adjacent to the lamp, or an entire edge portion of the reflector includes a printing portion made of colorless ink containing a light scattering agent such that light reflected from a bottom surface of the display device that causes constructive interference with light emitting from the lamp is scattered thereby preventing a bright line on the display device and the printing portion is formed as a single body.

6. The display device of claim 5, wherein the at least one lamp includes two lamps.

7. The display device of claim 5, wherein the light guide has a plurality of patterns.

8. The display device of claim 7, wherein the patterns are dots.

9. A back light device for use in a liquid crystal display device, comprising:
   at least one lamp;
   a light guide plate for guiding light emitting from the lamp;
   a diffusing sheet for diffusing light emitting from the light guide plate;
   at least one prism sheet located on the diffusing sheet, concentrating light;
   a protecting sheet located on the prism sheet; and
   a reflector located under the light guide plate, reflecting light directing downward the light guide plate,
   wherein at least one of an entire edge portion of the protecting sheet adjacent to the lamp or an entire edge portion of the reflector includes a printing portion made of colorless ink containing a light scattering agent such that light reflected from a bottom surface of the display device that causes constructive interference with light emitting from the lamp is scattered thereby preventing a bright line on the display device and the printing portion is formed as a single body.

10. The back light device of claim 9, wherein the at least one lamp includes two lamps.

11. The backlight device of claim 9, wherein the light guide plate has a plurality of patterns.

12. The back light device of claim 11, wherein the patterns are dots.

13. A liquid crystal display device, comprising:
   a liquid crystal panel including two substrates with a liquid crystal layer interposed therebetween; and
   a back light device including:
   a) at least one lamp;
   b) a light guide plate for guiding light emitting from the lamp;
   c) a diffusing sheet for diffusing light emitting from the light guide plate;
   d) at least one prism sheet located on the diffusing sheet, concentrating light;
   e) a protecting sheet located on the prism sheet; and
   f) a reflector located under the light guide plate, reflecting light directing downward the light guide plate,
   wherein at least one of an entire edge portion of the protecting sheet adjacent to the lamp or an entire edge portion of the reflector includes a printing portion made of colorless ink containing a light scattering agent such that light reflected from a bottom surface of the display device that causes constructive interference with light emitting from the lamp is scattered thereby preventing a bright line on the display device and the printing portion is formed as a single body.

14. The display device of claim 13, wherein the at least one lamp includes two lamps.

15. The display device of claim 13, wherein the light guide has a plurality of patterns.

16. The display device of claim 15, wherein the patterns are dots.

17. A back light device for use in a liquid crystal display device, comprising:
   at least one lamp;
   a light guide plate for guiding light emitting from the lamp;
   a diffusing sheet for diffusing light emitting from the light guide plate;
   at least one prism sheet located on the diffusing sheet, concentrating light;
   a protecting sheet located on the prism sheet;

a reflector located under the light guide plate, reflecting light directing downward the light guide plate, wherein at least one of an entire edge portion of the diffusing sheet adjacent to the lamp, an entire edge portion of the protecting sheet adjacent to the lamp, or an entire edge portion of the reflector includes a printing portion made of colorless ink containing a light scattering agent such that light reflected from a bottom surface of the display device that causes constructive interference with light emitting from the lamp is scattered thereby preventing a bright line on the display device, and wherein the printing portion is formed as a single body having a convex and concave surface topology.

* * * * *